(12) United States Patent
Fujita et al.

(10) Patent No.: US 6,468,088 B1
(45) Date of Patent: Oct. 22, 2002

(54) SOLID HAVING REVERSIBLY INVISIBLE/ VISIBLE THERMOCHROMIC CONSTRUCTION ENCLOSED THEREIN

(75) Inventors: Katsuyuki Fujita, Aichi (JP); Tsutomu Tomatsu, Aichio (JP); Nobuaki Matsunami, Aichi (JP)

(73) Assignee: The Pilot Ink Co., Ltd., Aichi (JP)

( * ) Notice: Subject to any disclaimer, the term of this patent is extended or adjusted under 35 U.S.C. 154(b) by 27 days.

(21) Appl. No.: 09/698,203

(22) Filed: Oct. 30, 2000

(30) Foreign Application Priority Data

Oct. 29, 1999 (JP) .......................................... 11-308445

(51) Int. Cl.⁷ ............................................. G09B 23/28
(52) U.S. Cl. ........................ 434/295; 434/274; 446/268
(58) Field of Search ................................ 434/274, 295; 446/219, 268, 373, 385

(56) References Cited

U.S. PATENT DOCUMENTS

| 4,028,118 | A | | 6/1977 | Nakasuji et al. ............... 106/21 |
| 4,720,301 | A | | 1/1988 | Kito et al. ...................... 106/21 |
| 4,732,810 | A | | 3/1988 | Kito et al. ............... 428/402.2 |
| 5,480,341 | A | * | 1/1996 | Plakos ..................... 343/274 X |
| 5,490,956 | A | | 2/1996 | Kito et al. ................... 252/583 |
| 5,558,699 | A | | 9/1996 | Nakashima et al. ....... 106/21 A |
| 5,879,443 | A | | 3/1999 | Senga et al. ................. 106/498 |

\* cited by examiner

*Primary Examiner*—John A. Ricci
(74) *Attorney, Agent, or Firm*—Sughrue Mion, PLLC

(57) ABSTRACT

A solid has a reversibly invisible/visible thermochromic internal construction enclosed therein which is composed of a solid made of a transparent resin and a fluorescent internal construction showing the internal structure of the solid enclosed therein, wherein a reversible thermochromic layer containing a reversible thermochromic composition is formed on the surface of the solid, or the transparent resin contains a reversible thermochromic composition.

10 Claims, 2 Drawing Sheets

SOLID HAVING REVERSIBLY INVISIBLE/VISIBLE THERMOCHROMIC CONSTRUCTION ENCLOSED THEREIN

FIELD OF THE INVENTION

This invention relates to a solid having a reversibly invisible/visible thermochromic internal construction enclosed therein. More particularly, it relates to a solid having a reversibly invisible/visible thermochromic internal construction enclosed therein wherein the internal structure of the solid becomes reversibly invisible and visible due to temperature change.

BACKGROUND OF THE INVENTION

U.S. Pat. No. 5,490,956 discloses a constitution wherein a reversible thermochromic layer is formed on the surface of a solid to thereby make the inside invisible/visible.

In the conventional solid having an invisible/visible internal construction as described above, the interior can be made visible or invisible depending on temperature change. Thus, it is applicable in the fields of toys, ornaments, etc.

SUMMARY OF THE INVENTION

The inventor has found out that an effect of achieving the invisible/visible state, which is superior to the effect of the conventional solid as described above, can be established by enclosing a construction having a structure concerning the shape of a solid and using a fluorescent material as the above-described construction. Namely, the invention aims at providing a solid having a reversibly invisible/visible thermochromic internal construction enclosed therein which is excellent in variance and the internal construction of which can be made more definitely visible in the visible state.

The present invention provides a solid having a reversibly invisible/visible thermochromic internal construction enclosed therein which is composed of a solid made of a transparent resin and a fluorescent internal construction showing the internal structure of the solid enclosed therein, wherein a reversible thermochromic layer containing a reversible thermochromic composition is formed on the surface of the solid; or a solid having a reversibly invisible/visible thermochromic internal construction enclosed therein which is composed of a solid made of a transparent resin and a fluorescent internal construction showing the internal structure of the solid enclosed therein, wherein the transparent resin contains a reversible thermochromic composition

Figure 1:
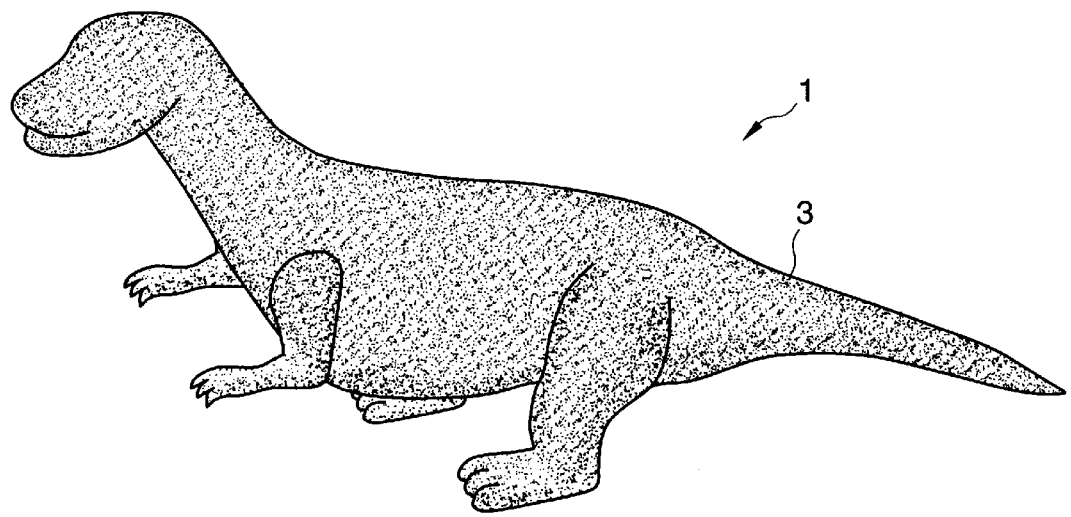
FIG. 1 provides a perspective view of an example of the embodiment of the solid having a reversibly invisible/visible thermochromic internal construction enclosed therein according to the invention which is in the state where the whole reversible thermochromic layer is colored.

wherein 1 denotes solid having reversibly invisible/visible thermochromic internal construction enclosed therein; 2 denotes fluorescent internal construction; and 3 denotes solid.

DETAILED DESCRIPTION OF THE INVENTION

More particularly speaking, the above-described solid made of a transparent resin is exemplified by toys modeled after dolls, animals, vehicles, buildings, plants, foods, stones and the like.

Either thermoplastic resins or thermosetting resins can be used as the transparent resin as described above. Although it is preferable that the above-described solid is transparent and colorless, it is also possible to use a colored and transparent solid.

The internal construction to be enclosed in the above-described solid is modeled after the internal structure of the solid concerning the shape of the solid. For example, a constitution wherein the above-described internal construction modeled after an animal skeleton is enclosed in a solid modeled after this animal may be cited. It is preferable that the above-described construction is made of a resin similar to the solid, though the material of the construction is not restricted thereto. Because of fluorescing, the above-described construction can be definitely observed through the solid thereby achieving an unexpected effect, when the reversible thermochromic composition is discolored due to temperature change.

It is preferable that the above-described fluorescent internal construction is enclosed in such a state that its external face is in close contact with the solid, namely, a constitution wherein there is no space at the interface of the external face of the internal construction and the solid. This is because, in such a constitution, the vivid fluorescent color of the above-described construction is not blocked by the space but can be definitely observed when the reversible thermochromic composition is discolored.

Moreover, the appearance of the internal construction varies depending on the state (i.e., colored or discolored) of the reversible thermochromic layer located at the invisible part (the backside) of the solid and thus more complicated variance can be achieved. In case of a solid composed of a fluorescent yellow internal construction enclosed in a solid provided with a reversible thermochromic surface-coating layer which reversibly turns from black to colorless, for example, when the visible side alone is discolored, the internal construction in the vivid fluorescent yellow color can be definitely observed against the black background since the reversible thermochromic layer in the backside is still in the colored state. When the whole reversible thermochromic layer is discolored, it seems as if the fluorescent yellow internal construction alone existed.

The above-described solid having an internal construction enclosed therein is provided with a reversible thermochromic layer containing a reversible thermochromic composition at least on a part of the surface.

As the above-described reversible thermochromic composition, it is preferable to use a three-component composition containing: (a) an electron-donating color-developing organic compound; (b) an electron-accepting compound; and (c) a reaction medium determining the temperature at which the color-developing reaction between these two components arises. For example, use may be made of the compositions described in U.S. Pat. Nos. 4,028,118 and 4,732,810.

Such a composition as described above undergoes color change at a definite temperature (i.e., the color change point). It remains in the discolored state within the temperature zone of the color change point or higher and turns into the colored state within the temperature zone lower than the color change point. In ordinary temperature zone, therefore, a specific one of these states is exclusively observed. Although the other state is maintained so long as the composition is heated or cooled in such a manner as allowing the expression of this state, the composition returns to its original state in the ordinary temperature zone when the heating or cooling is ceased. That is to say, it is a reversibly thermochromic composition of heat-discoloring type which shows a color change behavior with a relatively narrow hysteresis width.

It is also possible to use temperature-sensitive color change color memory compositions of heat-discoloring type which are described in U.S. Pat. Nos. 4,720,301, 5,879,443 and 5,558,699. Such a composition shows large hysteresis characteristics. Namely, the shape of a curve formed by plotting color density with an increase in temperature change (i.e., elevating temperature from the temperature zone lower than the color change point) largely differs from the shape of the curve formed by plotting color density with a decrease in temperature (i.e., lowering temperature from the temperature zone higher than the color change point). Thus the colored state in the temperature zone lower than the color change point in the low temperature side or the discolored state in the temperature zone higher than the color change point in the high temperature side can be mutually memorized and maintained after ceasing the cooling or heating.

It is also possible to use a reversible thermochromic composition of heat-coloring type which contains, as the electron-accepting compound (b), a specific alkoxyphenol compound carrying a linear or branched alkyl group having 3 to 18 carbon atoms.

Moreover, use can be made, as the electron-accepting compound contained in the reversible thermochromic composition of the heat-coloring type as described above, of hydroxybenzoic acid esters such as 3-hydroxybenzoic acid tridecyl ester, 3-hydroxybenzoic acid tetradecyl ester, 3-hydroxybenzoic acid pentadecyl ester, 3-hydroxybenzoic acid hexadecyl ester, 3-hydroxybenzoic acid heptadecyl ester, 3-hydroxybenzoic acid octadecyl ester, 3-hydroxybenzoic acid nonadecyl ester, 3-hydroxybenzoic acid eicosyl ester, 3-hydroxybenzoic acid heneicosyl ester, 3-hydroxybenzoic acid docosyl ester, 4-hydroxybenzoic acid tridecyl ester, 4-hydroxybenzoic acid tetradecyl ester, 4-hydroxybenzoic acid pentadecyl ester, 4-hydroxybenzoic acid hexadecyl ester, 4-hydroxybenzoic acid heptadecyl ester, 4-hydroxybenzoic acid octadecyl ester, 4-hydroxybenzoic acid nonadecyl ester, 4-hydroxybenzoic acid eicosyl ester, 4-hydroxybenzoic acid heneicosyl ester, 4-hydroxybenzoic acid docosyl ester, 3,4-dihydroxybenzoic acid tridecyl ester, 3,4-dihydroxybenzoic acid tetradecyl ester, 3,4-dihydroxybenzoic acid pentadecyl ester, 3,4-dihydroxybenzoic acid hexadecyl ester, 3,4-dihydroxybenzoic acid heptadecyl ester, 3,4-dihydroxybenzoic acid octadecyl ester, 3,4-dihydroxybenzoic acid nonadecyl ester, 3,4-dihydroxybenzoic acideicosyl ester, 3,4-dihydroxybenzoic acid heneicosyl ester, 3,4-dihydroxybenzoic acid docosyl ester, 3,5-dihydroxybenzoic acid tridecyl ester, 3,5-dihydroxybenzoic acid tetradecyl ester, 3,5-dihydroxybenzoic acid pentadecyl ester, 3,5-dihydroxybenzoic acid -enadecyl ester, 3,5-dihydroxybenzoic acid hexadecyl ester, is 3,5-dihydroxybenzoic acid heptadecyl ester, 3,5-dihydroxybenzoic acid octadecyl ester, 3,5-dihydroxybenzoic acid nonadecyl ester, 3,5-dihydroxybenzoic acid eicosyl ester, 3,5-dihydroxybenzoic acid heneicosyl ester, 3,5-dihydroxybenzoic acid docosyl ester and the like.

The reversible thermochromic composition as described above contains the components (a), (b) and (c) as the essential components. Although the ratio of these components varies depending on the concentration, color change temperature, color change mode and the components employed, desired characteristics are generally obtained by using from 0.1 to 50 parts (by weight, the same will apply hereinafter), preferably from 0.5 to 20 parts of the component (b) and from 1 to 200 parts, preferably from 5 to 100 parts and still preferably from 20 to 50 parts by weight of the component (c) each per part of the component (a).

The above-described components (a), (b) and (c) may be each a mixture of two or more compounds.

It is preferable that the above-described reversible thermochromic composition is used in the form of a microcapsule pigment wherein the composition is encapsulated in microcapsules, since requirements to be satisfied in practice (for example, vivid and dense coloration, high uniformity, high dispersion stability, high chemical resistance, high heat resistance) can be thus satisfied.

From the viewpoint of satisfying the requirements in practical use, the particle diameter of the above-described microcapsules ranges from 0.01 to 100 $\mu$m, preferably from 0.1 to 50 $\mu$m and still preferably from 0.1 to 30 $\mu$m.

By using microcapsules having an average particle diameter of 0.01 to 6 $\mu$m, moreover, the reversible thermochromic composition encapsulated therein exhibits a high transparency in the discolored state. Thus, the internal construction can be definitely observed, which contributes to the provision of a solid having a reversibly invisible/visible thermochromic internal construction enclosed therein achieving an improved unexpected effect and variance.

The microcapsules can be prepared by a publicly known method such as interfacial polymerization, in situ polymerization, submerged hardening coating, phase separation from an aqueous solution, phase separation from an organic solvent, meltdispersion cooling, air suspension coating, spray drying or the like.

In addition, a secondary resin coating may be formed on the surface of the microcapsule pigment to improve the durability, or the surface properties of the microcapsule pigment may be modified depending on the purpose before using in practice.

The above-described reversible thermochromic composition or microcapsule pigment having the same encapsulated therein is dispersed in a vehicle containing a resin and employed as an ink or a coating. Thus, the reversible thermochromic layer can be formed by a publicly known method such as printing means (padding, transfer, etc.), brushing, spray coating, electrostatic coating, electrodeposition coating, flow coating, roller coating, dip coating, etc.

The reversible thermochromic composition as described above is a layer formed by compounds remaining after the evaporation of the solvent. The above-described reversible thermochromic composition or microcapsule pigment is fixed in the state of having been dispersed in the resin.

The vehicle may optionally contain various additives such as an ultraviolet absorber, an infrared absorber, an antioxidant, a singlet oxygen quenching agent, an aging retardant, an antistatic agent, a thixotropic agent, a deforming agent, an extender pigment, a viscosity controlling agent, a dispersant, a matting agent, a penetrating agent, a pH regulating agent, a preservative, a rust preventive and the like.

It is also possible to form a reversible thermochromic layer by using a thermochromic material which is obtained by dispersing fine particles of the above-described reversible thermochromic composition in a vinyl chloride-vinyl acetate copolymer resin.

In the invention, the above-described reversible thermochromic composition or the microcapsule pigment having the same encapsulated therein can be blended with the transparent resin and then employed in forming the solid, thereby achieving a similar effect as in the system with the formation of the reversible thermochromic layer.

In the solid having a reversibly invisible/visible thermochromic internal construction enclosed therein of the constitution as described above, an additional effect, which cannot be established by using a merely fluorescent internal construction, can be achieved by imparting luminous (glow-in-the-dark) properties to the fluorescent internal construction. The fluorescent internal construction becomes visible or invisible depending on temperature. Therefore, the change in the mode as described above can be definitely observed in a well-lighted place but nothing can be observed in a dark place. By imparting luminous properties, a solid having an invisible/visible internal construction, which exhibits a favorable ornamental effect and change in the mode in the dark too, can be obtained.

As the luminous material for imparting the luminous properties to the internal construction, use can be effectively made of any publicly known luminous materials, for example, CaS/Bi materials, CaSrS/Bi materials, ZnS/Cu materials, ZnCdS/Cu materials, materials disclosed in JP-A-7-11250 which are obtained by adding europium, dysprosium, samarium, etc. as an activator to $SrAl_2O_4$, $Sr_4Al_{14}O_{25}$ or $CaAl_2O_4$, and $Sr(AlB)_2O_4$;EuDy, $Sr(AlB)_3O_6$;EuDy or $Sr(AlB)_4O_7$;EuDy disclosed in JP-A-10-168448, etc. (the term "JP-A" as used herein means an "unexamined published Japanese patent application").

On the solid having a reversibly invisible/visible thermochromic internal construction enclosed therein thus obtained, a layer containing a light stabilizer and/or a light shielding pigment may be further formed to thereby improve the light resistance or a top coat layer may be further formed to thereby improve the durability.

Examples of the above-described light shielding pigment include metallic gloss pigments, transparent titanium dioxide, transparent iron oxide, transparent cesium oxide and transparent zinc oxide.

The solid having a reversibly invisible/visible thermochromic internal construction enclosed therein according to the invention can be obtained by forming a fluorescent construction modeled after the internal structure of a solid, enclosing the internal construction in the solid made of a transparent resin, and then applying or spraying a coating containing a reversible thermochromic composition. Alternatively, it can be obtained by forming a fluorescent construction modeled after the internal structure of a solid and then enclosing it in the solid made of a transparent resin containing a reversible thermochromic composition.

EXAMPLES

Now, examples of the embodiment of the invention will be given wherein all parts are by weight.

Figure 2:
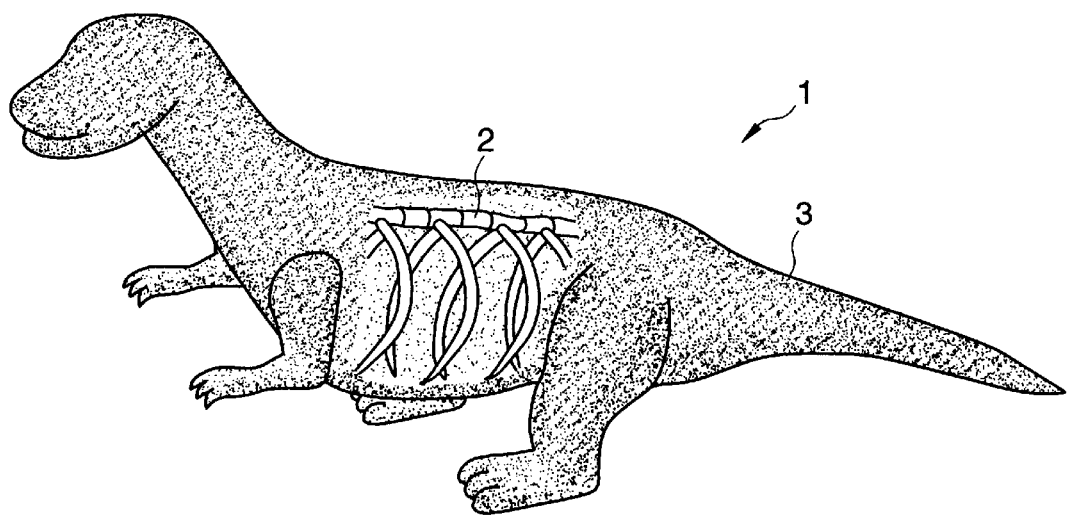
FIG. 2 provides a perspective view of the solid having a reversibly invisible/visible thermochromic internal construction enclosed therein of FIG. 1 which is in the state where the reversible thermochromic layer is partly discolored.
Figure 3:
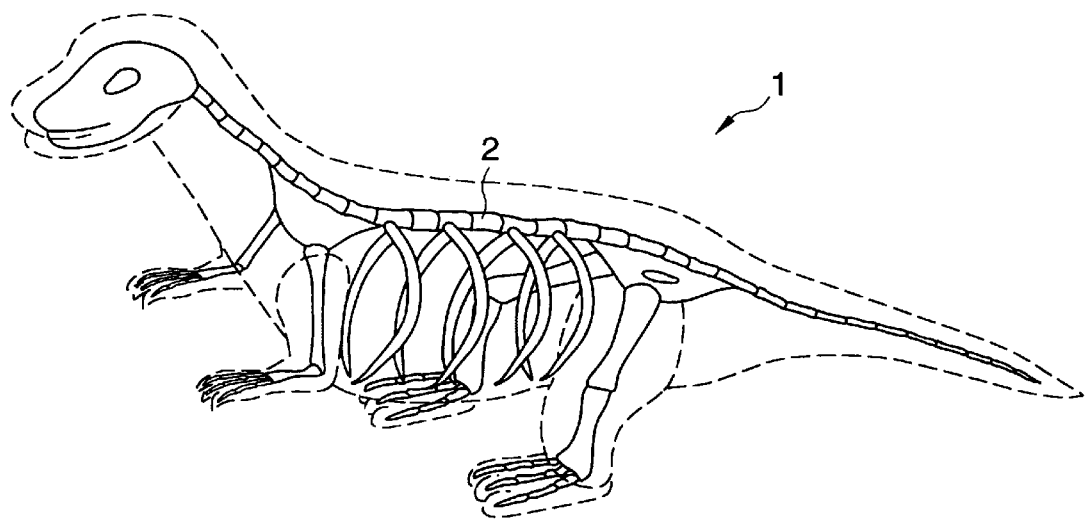
FIG. 3 provides a perspective view of the solid having a reversibly invisible/visible thermochromic internal construction enclosed therein of FIG. 1 which is in the state where the whole reversible thermochromic layer is discolored.

EXAMPLE 1 (see FIGS. 1 to 3)

Formation of fluorescent internal construction and solid having the same enclosed therein:

100.0 parts of a non-rigid vinyl chloride compound was mixed uniformly with 1.0 part of a fluorescent pink pigment (EPOCOLOR™ FP1000N, manufactured by Nippon Shokubai Co., LTd.). The obtained blend was injection-molded by using a mold in the shape of skeleton to give a fluorescent pink internal construction 2.

The above-described internal construction 2 was put into a dinosaur mold and injection-molding was carried out with the use of a transparent non-rigid vinyl chloride compound. Thus a solid in the shape of a dinosaur 3 having the internal construction 2 enclosed therein was obtained. Formation of solid having reversibly invisible/visible thermochromic internal construction enclosed therein:

A solid having a reversibly invisible/visible thermochromic internal construction enclosed therein 1 was obtained by spray-coating the surface of the above-described solid 3 with a reversible thermochromic ink obtained by uniformly stirring 5.0 parts of a microcapsule pigment (being in an orange color at about 30° C. or below and colorless at temperatures higher than 30° C.) wherein a reversible thermochromic composition composed of 3.0 parts of 3-cyclohexylamino-7-methylfluoran, 6.0 parts of 2,2-bis-(4-hydroxyphenyl) propane, 25.0 parts of cetyl alcohol and 25.0 parts of stearyl caprate was encapsulated in an epoxy resin film, 5.0 parts of another microcapsule pigment (being in a black color at about 30° C. or below and colorless at temperatures higher than 30° C.) wherein a reversible thermochromic composition composed of 3.0 parts of 3-dibutylamino-6-methyl-7-anilinofluoran, 6.0 parts of 2,2-bis- (4-hydroxyphenyl) propane, 25.0 parts of cetyl alcohol and 25.0 parts of stearyl caprate was encapsulated in an epoxy resin film, 50.0 parts of a 50% acrylic resin/xylene solution, 30.0 parts of xylene and 30.0 parts of methyl isobutyl ketone to thereby form a reversible thermochromic layer.

In the environment at 30° C. or below, the solid having the reversibly invisible/visible thermochromic internal construction enclosed therein 1 as described above was visible as a brown dinosaur. When touched with a finger, the reversible thermochromic layer at the dinosaur body was discolored and thus the fluorescent pink internal construction 2 became visible. Since the reversible thermochromic layer in the backside was still in the colored state, the shape and color tone of the skeleton could be vividly observed (FIG. 2).

When the whole solid 1 was heated to higher than 30° C., the reversible thermochromic layer was discolored and thus it seemed as if the fluorescent pink internal construction alone existed (FIG. 3).

These changes could be repeatedly observed by changing temperature.

EXAMPLE 2

Formation of fluorescent internal construction and solid having the same enclosed therein:

100.0 parts of a non-rigid vinyl chloride compound was mixed uniformly with 2.0 parts of a fluorescent yellow pigment (EPOCOLOR™ FP117, manufactured by Nippon Shokubai Co., Ltd.). The obtained blend was injection-molded by using a mold in the shape of skeleton to give a fluorescent yellow internal construction.

The above-described internal construction was put into a dinosaur mold and injection-molding was carried out with the use of a transparent polyurethane elastomer resin. Thus a solid in the shape of a dinosaur having the internal construction enclosed therein was obtained. Formation of solid having reversibly invisible/visible thermochromic internal construction enclosed therein:

To a reversible thermochromic composition composed of 1.5 parts of 1,2-benz-6-(N-ethyl-N-isobutylamino) fluoran, 6.0 parts of 1,1-bis-(4-hydroxyphenyl)-n-decane, 10.0 parts of cetyl caprate and 40.0 parts of stearyl caprate, 30.0 parts of an aromatic isocyanateprepolymer and 3.50 parts ethyl acetate were added as wall membrane components. The obtained mixture was emulsified by stirring in a 15% gelatin solution until the particle size attained 3 to 6 μm. Next, 2.5 parts of an aliphatic amine was added to give a suspension of a reversible thermochromic microcapsule pigment.

Then the microcapsule pigment (being in a pink color at about 30° C. or below and colorless at temperatures higher than 30° C., average particle diameter: 3 μm) was isolated from the above-described microcapsule pigment suspension by centrifugation.

A solid having a reversibly invisible/visible thermochromic internal construction enclosed therein was obtained by spray-coating the surface of the above-described solid with a reversible thermochromic ink obtained by uniformly stirring 10.0 parts of the microcapsule pigment, 50.0 parts of a 50% acrylic resin/xylene solution, 30.0 parts of xylene and 30.0 parts of methyl isobutyl ketone to thereby form a reversible thermochromic layer.

In the environment at 30° C. or below, the solid having the reversibly invisible/visible thermochromic internal construction enclosed therein as described above was visible as a pink dinosaur. When touched with a finger, the reversible thermochromic layer at the dinosaur body was discolored and thus the fluorescent yellow internal construction became visible. Since the reversible thermochromic layer in the backside was still in the colored state, the shape and color tone of the skeleton could be vividly observed.

Since the above-described reversible thermochromic layer was excellent in transparency in the discolored state, the shape and color tone of the skeleton could be definitely observed.

When the whole solid was heated to higher than 30° C., the reversible thermochromic layer was discolored and thus it seemed as if the fluorescent yellow internal construction alone existed.

These changes could be repeatedly observed by changing temperature.

Example 3

Formation of fluorescent internal construction and solid having the same enclosed therein:

100.0 parts of a non-rigid vinyl chloride compound was mixed uniformly with 2.0 parts of a fluorescent orange pigment (EPOCOLOR™ FP116, manufactured by Nippon Shokubai Co., Ltd.) and 15.0 parts of a luminous material (ZnCdS/Cu material, maximum luminous wavelength 600 nm). The obtained blend was injection-molded by using a mold in the shape of skeleton to give a fluorescent orange internal construction.

The above-described internal construction was put into a dinosaur mold and injection-molding was carried out with the use of a transparent non-rigid vinyl chloride compound. Thus a solid in the shape of a dinosaur having the internal construction enclosed therein was obtained. Formation of solid having reversibly invisible/visible thermochromic internal construction enclosed therein:

A solid having a reversibly invisible/visible thermochromic internal construction enclosed therein was obtained by spray-coating the surface of the above-described solid with a reversible thermochromic ink obtained by uniformly stirring 3.0 parts of a microcapsule pigment (being in an orange color at about 30° C. or below and colorless at temperatures higher than 30° C.) wherein a reversible thermochromic composition composed of 3.0 parts of 3-cyclohexylamino-7-methylfluoran, 6.0 parts of 2,2-bis-(4-hydroxyphenyl) propane, 25.0 parts of cetyl alcohol and 25.0 parts of stearyl caprate was encapsulated in an epoxy resin film, 7.0 parts of another microcapsule pigment (being in a black color at about 30° C. or below and colorless at temperatures higher than 30° C.) wherein a reversible thermochromic composition composed of 3.0 parts of 3-dibutylamino-6-methyl-7-anilinofluoran, 6.0 parts of 2,2-bis- (4-hydroxyphenyl) propane, 25.0 parts of cetyl alcohol and 25.0 parts of stearyl caprate was encapsulated in an epoxy resin film, 50.0 parts of a 50% acrylic resin/xylene solution, 30.0 parts of xylene and 30.0 parts of methyl isobutyl ketone to thereby form a reversible thermochromic layer.

In the environment at 30° C. or below, the solid having the reversibly invisible/visible thermochromic internal construction enclosed therein as described above was visible as a dark brown dinosaur. When touched with a finger, the reversible thermochromic layer at the dinosaur body was discolored and thus the fluorescent orange internal construction became visible. Since the reversible thermochromic layer in the backside was still in the colored state, the shape and color tone of the skeleton could be vividly observed.

When the whole solid was heated to higher than 30° C., the reversible thermochromic layer was discolored and thus it seemed as if the fluorescent orange internal construction alone existed.

These changes could be repeatedly observed by changing temperature.

Further, the above-described solid was irradiated with a fluorescent lamp of a luminous intensity of 500 lux for 5 minutes and then observed in the dark. In this case, nothing was visible at 30° C. or below. When heated to higher than 30° C., the reversible thermochromic layer was discolored and the luminous orange internal construction was observed as if the dinosaur skeleton appeared. When cooled to 30° C. or below again, the luminous orange internal construction became invisible.

Example 4

Formation of fluorescent internal construction and solid having the same enclosed therein:

100.0 parts of a non-rigid vinyl chloride compound was mixed uniformly with 2.0 parts of a fluorescent yellow pigment (EPOCOLOR™ FP117, manufactured by Nippon Shokubai Co., Ltd.) and 15.0 parts of a luminous material (LumiNova, manufactured by Nemoto & Co., Ltd., maximum luminous wavelength 520 nm). The obtained blend was injection-molded by using a mold in the shape of skeleton to give a fluorescent yellow internal construction. Formation of solid having reversibly invisible/visible thermochromic internal construction enclosed therein:

A solid in the shape of a doll having a reversibly invisible/visible thermochromic internal construction enclosed therein was obtained by putting the above-described solid in a doll mold, injecting a reversible thermochromic resin prepared by uniformly mixing 20.0 parts a microcapsule pigment (being in an orange color at about 30° C. or below and colorless at temperatures higher than 30° C.) wherein a reversible thermochromic composition composed of 3.0 parts of 3-cyclohexylamino-7-methylfluoran, 6.0 parts of 1,1-bis- (4-hydroxyphenyl) ethane, 25.0 parts of cetyl alcohol and 25.0 parts of stearyl caprate was encapsulated in an epoxy resinfilm, 1000.0 parts of an addition reaction type transparent silicone rubber and 10.0 parts of a silicone hardening agent, hardening the mixture at 150° C. for 30 minutes, further allowing to stand at room temperature for a day, and then taking out from the mold.

In the environment at 30° C. or below, the solid having the reversibly invisible/visible thermochromic internal construction enclosed therein as described above was visible as an orange doll. When the doll body was touched with a finger, the fluorescent yellow internal construction became visible. Since the reversible thermochromic layer in the backside was still in the colored state, the shape and color tone of the skeleton could be vividly observed.

When the whole solid was heated to higher than 30° C., the reversible thermochromic layer was discolored and thus it seemed as if the fluorescent yellow internal construction alone existed.

These changes could be repeatedly observed by changing temperature.

Further, the above-described solid was irradiated with a fluorescent lamp of a luminous intensity of 500 lux for 5 minutes and then observed in the dark. In this case, nothing was visible at 30° C. or below. When heated to higher than 30° C., the reversible thermochromic layer was discolored and the luminous yellowish green internal construction was observed as if the human skeleton appeared. When cooled to 30° C. or below again, the luminous yellowish green internal construction became invisible.

Example 5

Formation of fluorescent internal construction and solid having the same enclosed therein:

100.0 parts of a non-rigid vinyl chloride compound was mixed uniformly with 2.0 parts of a fluorescent orange pigment (EPOCOLOR™ FP116, manufactured by Nippon Shokubai Co., Ltd.) and 10.0 parts of a luminous material (GSS, manufactured by Nemoto & Co., Ltd., maximum luminous wavelength 530 nm). The obtained blend was injection-molded by using a mold in the shape of engine to give a fluorescent orange internal construction.

Formation of solid having reversibly invisible/visible thermochromic internal construction enclosed therein:

A solid in the shape of a miniature car having a reversibly invisible/visible thermochromic internal construction enclosed therein was obtained by putting the above-described internal construction in a miniature car mold, injecting a reversible thermochromic resin prepared by uniformly dispersing 80.0 parts a microcapsule pigment (being in a black color at about 30° C. or below and colorless at temperatures higher than 30° C.) wherein a reversible thermochromic composition composed of 3.0 parts of 3-dibutylamino-6-methyl-7-anilinofluoran, 6.0 parts of 2,2-bis-(4-hydroxyphenyl)propane, 25.0 parts of cetyl alcohol and 25.0 parts of stearyl caprate was encapsulated in an epoxy resin film, in 1000.0 parts of a polyurethane elastomer resin and injection-molding.

In the environment at 30° C. or below, the solid having the reversibly invisible/visible thermochromic internal construction enclosed therein as described above was visible as a black miniature car in a well-lightened place. When the hood of the miniature car was touched with a finger, the fluorescent orange internal construction became visible. Since the reversible thermochromic layer in the backside was still in the colored state, the shape and color tone of the engine could be vividly observed.

When the whole solid was heated to higher than 30° C., the reversible thermochromic layer was discolored and thus it seemed as if the fluorescent orange internal construction alone existed.

These changes could be repeatedly observed by changing temperature.

Further, the above-described solid was irradiated with a fluorescent lamp of a luminous intensity of 500 lux for 5 minutes and then observed in the dark. In this case, nothing was visible at 30° C. or below. When heated to higher than 30° C., the reversible thermochromic layer was discolored and the luminous yellowish green internal construction was observed as if the engine appeared. When cooled to 30° C. or below again, the luminous yellowish green internal construction became invisible.

Example 6

Formation of fluorescent internal construction and solid having the same enclosed therein:

100.0 parts of a non-rigid vinyl chloride compound was mixed uniformly with 1.0 part of a fluorescent green pigment (EPOCOLOR™ FP1025, manufactured by Nippon Shokubai Co., Ltd.). The obtained blend was injection-molded by using a mold in the shape of emerald to give a fluorescent green internal construction.

The above-described internal construction was put into a mold in the shape of stone and injection-molding was carried out with the use of a transparent non-rigid vinyl chloride compound. Thus a solid in the shape of a stone having the internal construction enclosed therein was obtained. Formation of solid having reversibly invisible/visible thermochromic internal construction enclosed therein:

To a reversible thermochromic composition composed of 3.0 parts of 3-cyclohexylamino-7-methylfluoran, 6.0 parts of 1,1-bis-(4-hydroxyphenyl)-n-decane, 10.0 parts of cetyl caprate and 40.0 parts of stearyl caprate, 30.0 parts of an aromatic isocyanate prepolymer and 3.50 parts ethyl acetate were added as wall membrane components. The obtained mixture was emulsified by stirring in a 15% gelatin solution until the particle size attained 3 to 6 $\mu$m. Next, 2.5 parts of analiphatic amine was added to give a suspension of a reversible thermochromic microcapsule pigment.

Then the microcapsule pigment A (being in an orange color at about 30° C. or below and colorless at temperatures higher than 30° C., average particle diameter: 3 $\mu$m) was isolated from the above-described microcapsule pigment suspension by centrifugation.

Further, a reversible thermochromic composition composed of 3.0 parts of 3-dibutylamino-6-methyl-7-anilinofluoran, 6.0 parts of 1,1-bis-(4-hydroxyphenyl)-n-decane, 10.0 parts of cetyl caprate and 40.0 parts of stearyl caprate was processed into microcapsules by the same method as described above to give a microcapsule pigment B (being in a black color at about 30° C. or below and colorless at temperatures higher than 30° C., average particle diameter: 3 $\mu$m).

A solid having a reversibly invisible/visible thermochromic internal construction enclosed therein was obtained by spray-coating the surface of the above-described solid with a reversible thermochromic ink obtained by uniformly stirring 5.0 parts of the microcapsule pigment A, 5.0 parts of the microcapsule pigment B, 50.0 parts of a 50% acrylic resin/xylene solution, 30.0 parts of xylene and 30.0 parts of methyl isobutyl ketone to thereby form a reversible thermochromic layer.

In the environment at 30° C. or below, the solid having the reversibly invisible/visible thermochromic internal construction enclosed therein as described above was visible as a brown stone. When the upper face of the stone was touched with a finger, the reversible thermochromic layer was discolored and thus the fluorescent green internal construction enclosed therein became visible. Since the reversible thermochromic layer in the backside was still in the colored state, the shape and color tone of the emerald could be vividly observed.

Since the above-described reversible thermochromic layer was excellent in transparency in the discolored state, the shape and color tone of the emerald could be definitely observed.

When the whole solid was heated to higher than 30° C., the reversible thermochromic layer was discolored and thus it seemed as if the fluorescent green internal construction alone existed.

These changes could be repeatedly observed by changing temperature.

Example 7

Formation of fluorescent internal construction and solid having the same enclosed therein:

100.0 parts of a non-rigid vinyl chloride compound was mixed uniformly with 1.0 part of a fluorescent pink pigment (EPOCOLOR™ FP1000N, manufactured by Nippon Shokubai Co., Ltd.). The obtained blend was injection-molded by using a mold in the shape of skeleton to give a fluorescent pink internal construction.

The above-described internal construction was put into a dinosaur mold and injection-molding was carried out with the use of a transparent non-rigid vinyl chloride compound. Thus a solid in the shape of a dinosaur having the internal construction enclosed therein was obtained.

Formation of solid having reversibly invisible/visible thermochromic internal construction enclosed therein:

A non-color change layer was formed on the back face of the above-described solid by spray-coating with a black non-color change ink.

Further, a reversible thermochromic layer was formed on the part having no non-color change layer as described above by spray-coating with a reversible thermochromic ink prepared by uniformly stirring 5.0 parts of a microcapsule pigment (being in an orange color at about 30° C. or below and colorless at temperatures higher than 30° C.) wherein a reversible thermochromic composition composed of 3.0 parts of 3-cyclohexylamino-7-methylfluoran, 6.0 parts of 2,2-bis-(4-hydroxyphenyl)propane, 25.0 parts of cetyl alcohol and 25.0 parts of stearyl caprate was encapsulated in an epoxy resin film, 50.0 parts of a 50% acrylic resin/xylene solution, 30.0 parts of xylene and 30.0 parts of methyl isobutyl ketone to thereby give a solid having a reversibly invisible/visible thermochromic internal construction enclosed therein.

In the environment at 30° C. or below, the solid having the reversibly invisible/visible thermochromic internal construction enclosed therein as described above was visible as a black and brown dinosaur. When the dinosaur body was touched with a finger, the skeleton shape and color tone of the fluorescent pink internal construction enclosed therein could be vividly observed.

These changes could be repeatedly observed by changing temperature.

This invention can provide a solid having a reversibly invisible/visible thermochromic internal construction enclosed therein which is composed of a transparent solid in various shapes and an inner construction enclosed in this solid. Since the internal construction has fluorescent nature, the visible/invisible effect can be remarkably improved and thus an internal visible/invisible effect superior to the conventional ones can be achieved, thereby giving a solid having a reversibly invisible/visible thermochromic internal construction enclosed therein with an unexpected favorable effect and variance.

While the invention has been described in detail and with reference to specific embodiments thereof, it will be apparent to one skilled in the art that various changes and modifications can be made therein without departing from the spirit and scope thereof.

This application is based on Japanese patent applications No. Hei-11-308445 filed on Oct. 29, 1999, the entire contents of which incorporated herein by reference.

What is claimed is:

1. A solid having a reversibly invisible/visible thermochromic internal construction enclosed therein which is composed of a solid made of a transparent resin and a fluorescent internal construction showing the internal structure of said solid enclosed therein, wherein a reversible thermochromic layer containing a reversible thermochromic composition is formed on the surface of said solid, and said fluorescent internal construction is enclosed in a state that the external face thereof is in close contact with said solid.

2. The solid having a reversibly invisible/visible thermochromic internal construction enclosed therein as claimed in claim 1, wherein said fluorescent internal construction contains a luminous material or has a luminous layer containing a luminous material formed on the surface thereof.

3. The solid having a reversibly invisible/visible thermochromic internal construction enclosed therein as claimed in claim 1, wherein said solid is a doll or an animal figure and said internal construction is in the shape of the skeleton of said doll or animal figure.

4. The solid having a reversibly invisible/visible thermochromic internal construction enclosed therein as claimed in claim 1, wherein the reversible thermochromic composition is encapsulated in a microcapsule pigment.

5. The solid having a reversibly invisible/visible thermochromic internal construction enclosed therein as claimed in claim 4, wherein the average particle diameter of said microcapsule pigment is from 0.01 to 6 $\mu$m.

6. A solid having a reversibly invisible/visible thermochromic internal construction enclosed therein which is composed of a solid made of a transparent resin and a fluorescent internal construction showing the internal structure of said solid enclosed therein, wherein said transparent resin contains a reversible thermochromic composition, and said fluorescent internal construction is enclosed in a state that the external face thereof is in close contact with said solid.

7. The solid having a reversibly invisible/visible thermochromic internal construction enclosed therein as claimed in claim 6, wherein said fluorescent internal construction contains a luminous material or has a luminous layer containing a luminous material formed on the surface thereof.

8. The solid having a reversibly invisible/visible thermochromic internal construction enclosed therein as claimed in claim 6, wherein said solid is a doll or an animal figure and said internal construction is in the shape of the skeleton of said doll or animal figure.

9. The solid having a reversibly invisible/visible thermochromic internal construction enclosed therein as claimed in claim 6, wherein the reversible thermochromic composition is encapsulated in a microcapsule pigment.

10. The solid having a reversibly invisible/visible thermochromic internal construction enclosed therein as claimed in claim 9, wherein the average particle diameter of said microcapsule pigment is from 0.01 to 6 $\mu$m.

* * * * *